Jan. 15, 1963

C. W. MIDDLETON, JR., ETAL
PRESS FOR FORMING CONTINUOUS PLANAR
THERMOPLASTIC SHEET MATERIAL 3,073,499

Filed Oct. 28, 1958

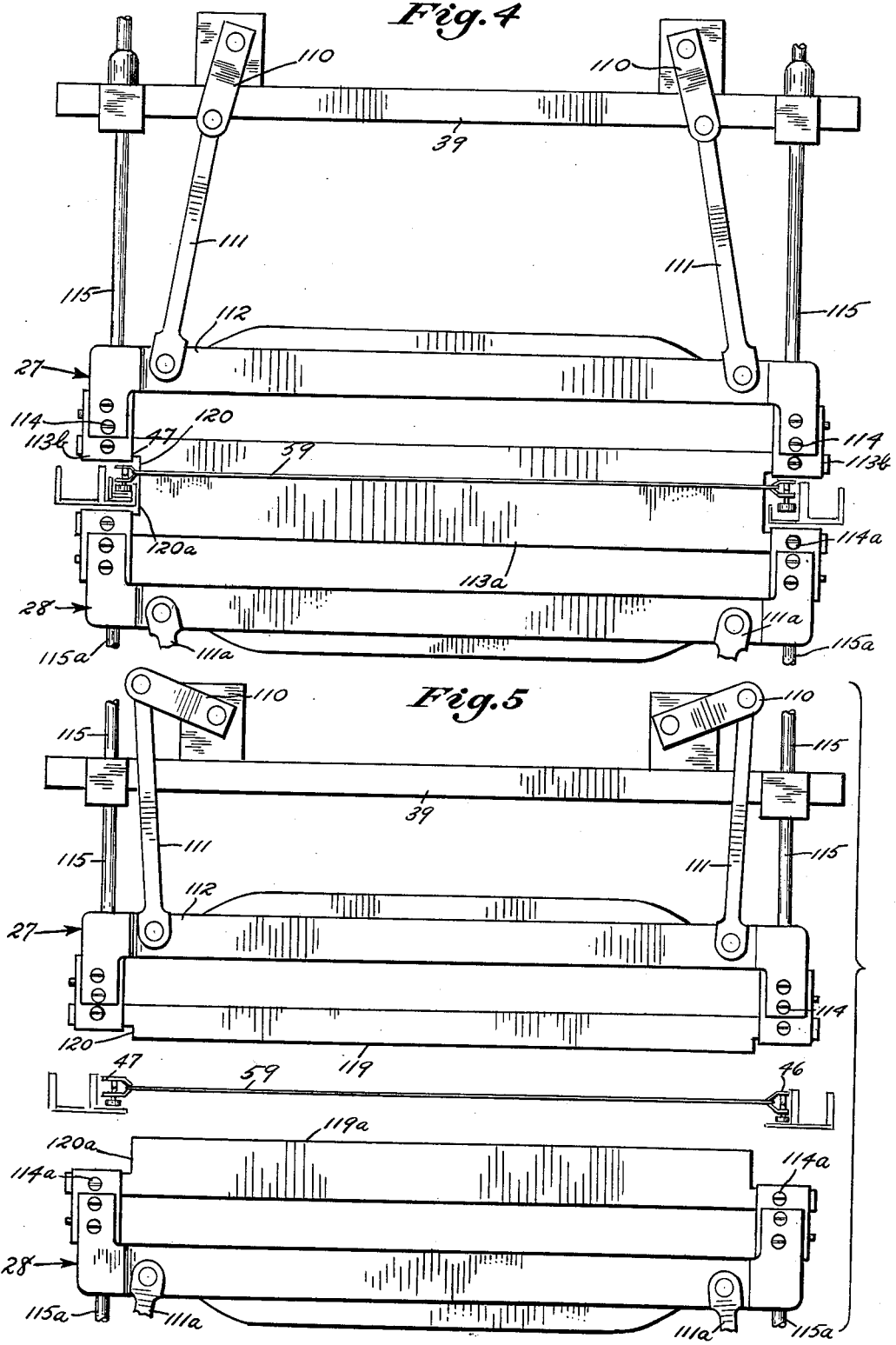

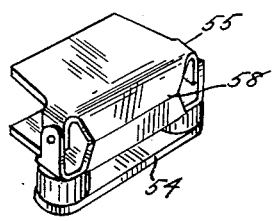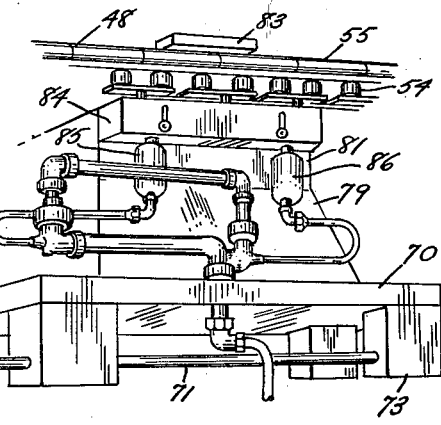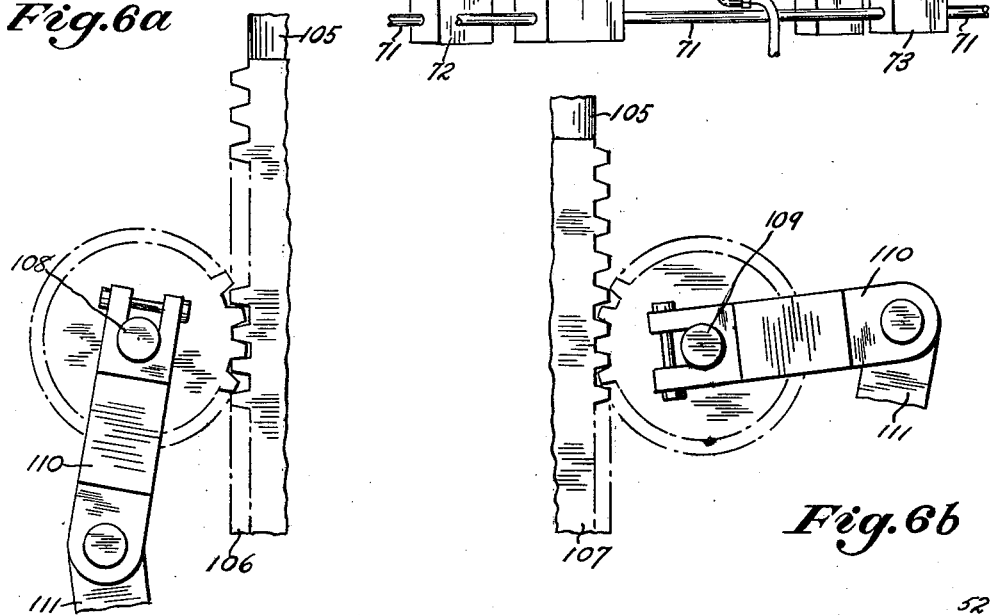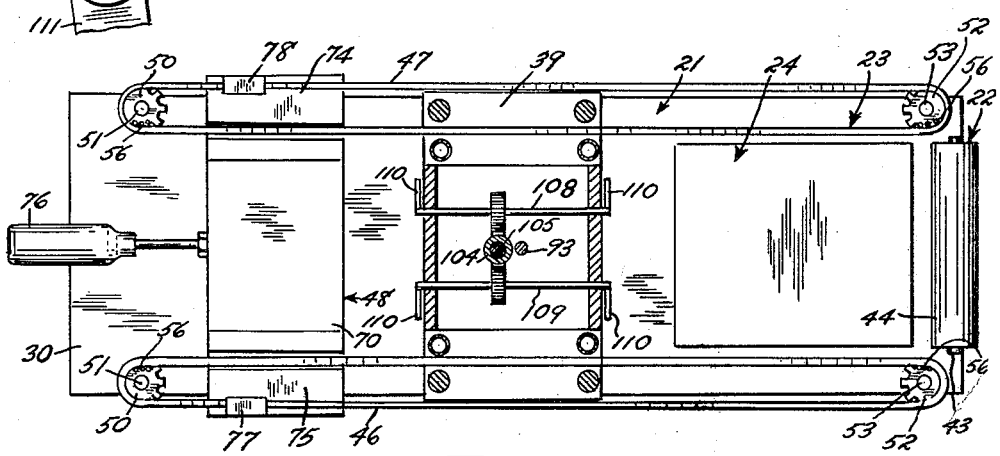

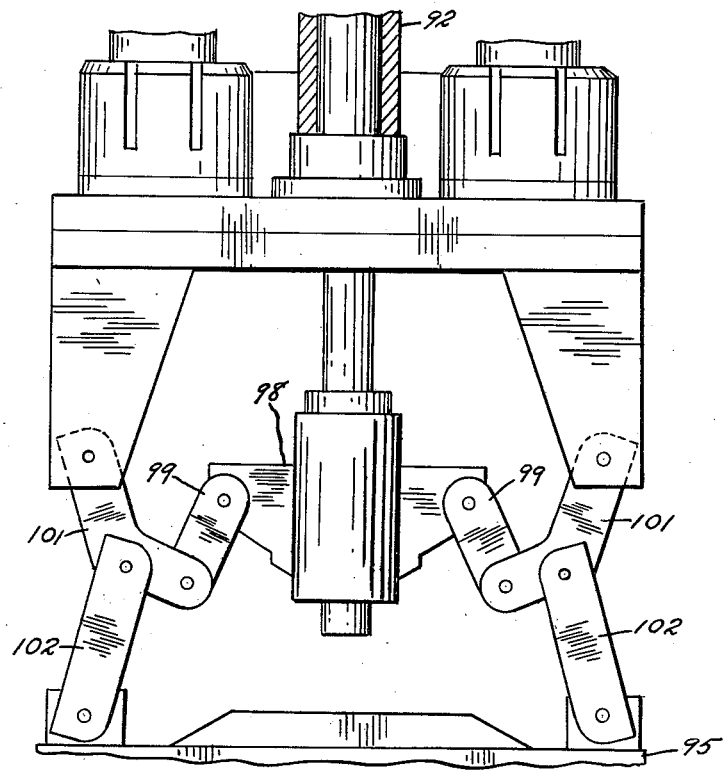
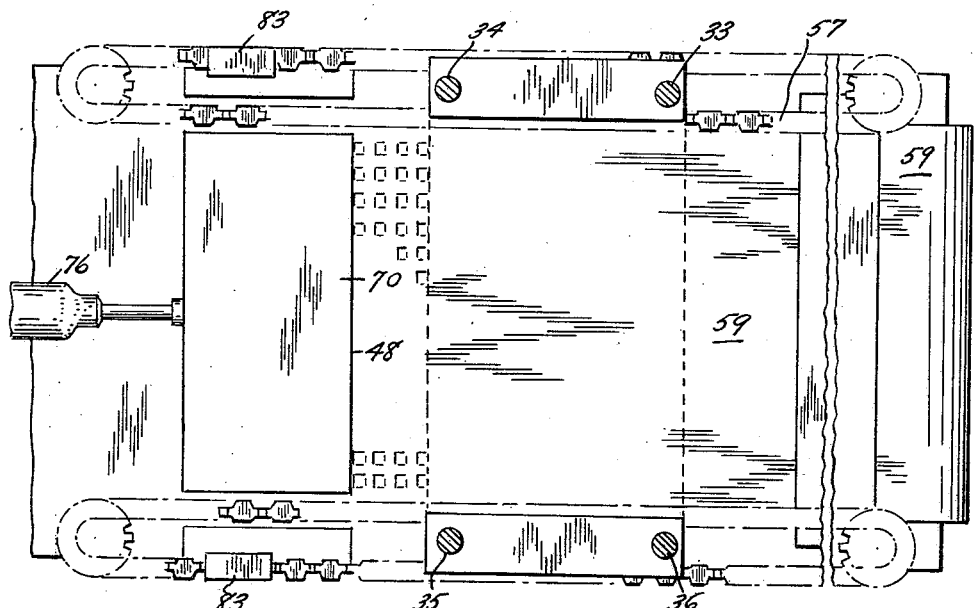

3,073,499
PRESS FOR FORMING CONTINUOUS PLANAR THERMOPLASTIC SHEET MATERIAL
Carl W. Middleton, Jr., Greenwich, Conn., and Earl F. Middleton, Pleasantville, N.Y., assignors to The Warner Brothers Company, Bridgeport, Conn., a corporation of Connecticut
Filed Oct. 28, 1958, Ser. No. 770,099
5 Claims. (Cl. 226—120)

This invention relates generally to the field of shaping and forming sheet thermoplastic synthetic resinous material, and more particularly to an improved press and process adapted to form a plurality of impressions in a continuous strip fed at substantially uniform intervals between sets of mating dies.

Devices of this type are generally known in the art, and the invention relates to specific constructional improvements in such devices. Presses of this type are characterized by a relatively elongated bed over which the continuous sheet material travels, usually being guided by engagement of the longitudinal edges of the material at periodic intervals. During the course of such travel, the material is first warmed to a temperature favoring the reception of an impression from a die or dies located at a subsequent station. After receiving the impression, the sheet is moved to a subsequent station for further processing or packaging.

Where the press is operated at a relatively low rate of speed, the warmed material receives the impression from the die, and has an opportunity to cool slightly before being moved to a subsequent station. Distorting of material which is still partially thermoplastic has little opportunity to occur, and such distortion is not transmitted along the axis of the continuous sheet. With the operation of presses of this type at a substantially higher rate, higher operating temperatures are involved, and cooling does not occur as rapidly as might be desired. Distortions in the sheet are transmitted to segments of the same which are still warm and as yet unshaped, so that the subsequent shaping operation meets a material not uniformly oriented, because of distortion within the planar surface, with resultant further distortion of the finished shaped article. Distortion is also transmitted from the segment of the sheet being shaped to segments which were formed in a previous cycle, resulting in the distortion of the shaped articles in such segments before the same have had time to cool sufficiently to maintain an imparted shape.

The bulk of the above distortion is caused by a natural tendency of molecularly oriented sheets to shrink between the preheating and forming stations of the device, the remainder occurring as the sheet is deformed from the plane of continuous feeding, or after the forming operation within the plane.

It is therefore among the principal objects of the present invention to provide an improved press of the class described in which the above mentioned disadvantages have been substantially eliminated.

Another object of the invention lies in the provision of improved press construction in which both male and female dies may be reciprocated into the plane of continuous feed, thereby reducing the time of movement of the dies and eliminating the necessity of shifting the plane of feed with each die impression.

Another object of the invention lies in the provision of improved press construction in which the length of intermittent feed of the continuous sheet from station to successive station may be accurately regulated by positive means.

Still another object of the invention lies in the provision of means for gripping each segment of the continuous sheet about the complete periphery thereof immediately prior to the commencement of a shaping operation, thereby preventing any distortion occurring from the shaping operation and shrinkage from being transmitted to adjoining segments of the continuous sheet.

A feature of the invention lies in the ready adaptability of the device to a wide variety of thermoplastic materials with a minimum of adjustment of the component parts thereof.

These objects and features, as well as other incidental ends and advantages, will become more clearly apparent during the course of the following disclosure, and be pointed out in the appended claims.

On the drawing, to which reference will be made in the specification, similar reference characters will be employed to designate corresponding parts throughout the several views.

FIGURE 4 is a fragmentary elevational view.

FIGURE 5 is a fragmentary elevational view corresponding to that seen on FIGURE 4 but showing an alternate relative position of certain of the component parts.

FIGURES 6a and 6b are fragmentary enlarged sectional views corresponding to the upper portions of FIGURES 4 and 5, respectively.

FIGURE 7 is a fragmentary plan view, partly in section.

FIGURE 8 is a fragmentary enlarged view in elevation, showing a portion of the synthetic resinous sheet feeding means which comprises a part of the device.

FIGURE 9 is an enlarged view in perspective showing one of the gripping elements which comprises a part of the synthetic resinous sheet feeding means.

FIGURE 10 is a fragmentary horizontal sectional view as seen from the plane 10—10 on FIGURE 1.

FIGURE 11 is an enlarged fragmentary side elevational view corresponding to the upper central portion of FIGURE 2, and showing the component parts in altered relative position.

Figure 1:
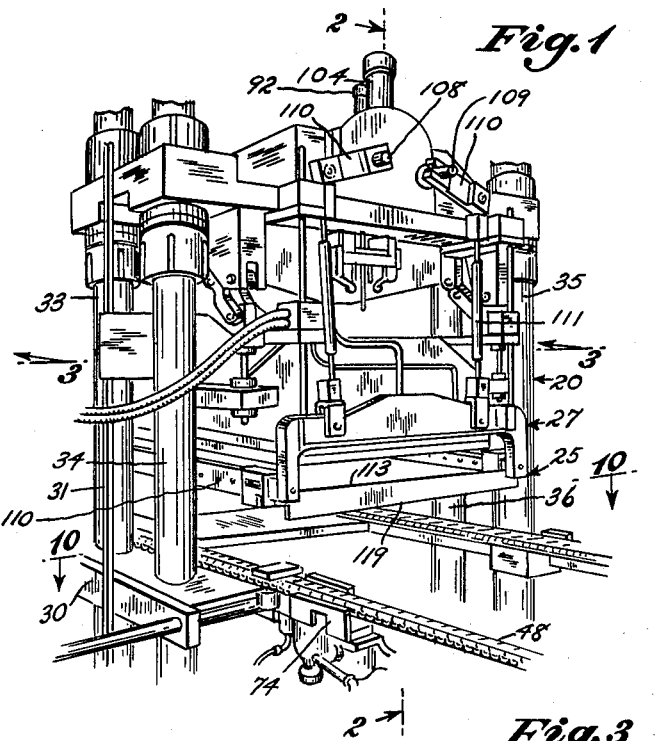
FIGURE 1 is a fragmentary view in perspective showing an embodiment of the invention.

In accordance with the invention, the device, generally indicated by reference character 20 comprises broadly: a frame element 21 (see FIGURE 7), sheet supply means 22, sheet feeding means 23, heating means 24, upper reciprocating die means 25, lower reciprocating die means 26, upper reciprocating sheet clamping means 27, and lower reciprocating sheet clamping means 28.

Figure 2:
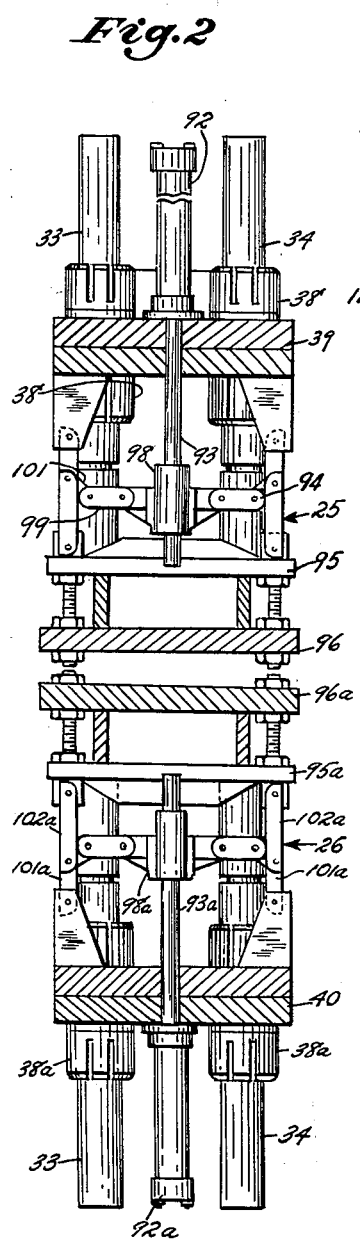
FIGURE 2 is a fragmentary vertical longitudinal sectional view thereof, as seen from the plane 2—2 on FIGURE 1.
Figure 3:
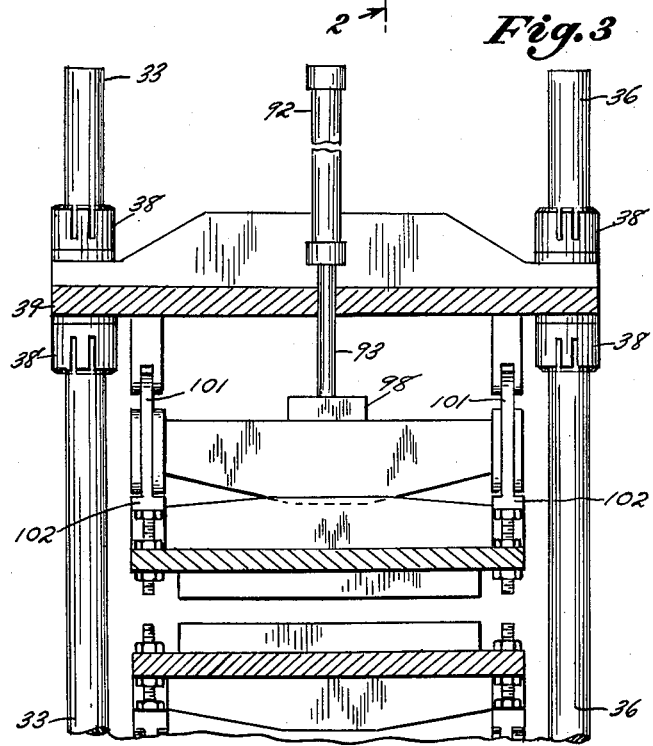
FIGURE 3 is a fragmentary vertical transverse sectional view as seen from the plane 3—3 on FIGURE 1.

The frame element 21 may be of any suitable construction well known in the art, and includes a horizontally disposed bed 30 and a vertical superstructure 31 upon which the reciprocating die and sheet clamping means 25–28 are mounted. As best seen in FIGURES 1, 2 and 10, the superstructure 31 includes four supporting main columns 33, 34, 35 and 36, each of which is provided with adjusting means 38 for positioning the upper horizontal platform 39 and lower horizontal platform 40.

The sheet supply means 22 may be of any conventional type well known in the art, as for example that best seen on FIGURE 7, which includes spool holding means 43 supporting a supply spool 44.

The sheet feeding means 23 is disclosed in our copending application, Serial No. 613,686; filed October 3, 1956 entitled Chain Means for Feeding Thermoplastic Sheets. It includes a lefthand feed chain element 46, a righthand feed chain element 47, both of which are substantially as shown in the above identified application as well as a chain advancement element 48. The lefthand feed chain element 46 and righthand feed chain element 47 are generally similar, each including a first sprocket 50 mounted for rotation about a vertically disposed axis 51, and a second sprocket 52 mounted for rotation about a second substantially vertically disposed axis 53. The sprocket chain 54 is provided with a plurality of clips 55 (see FIGURE 9) which are opened by means 56 disposed adjacent the sprockets 50 and 52, which means serve to open the clips both at the entry into the path of travel of the sheet 59 of plastic material, and at the point in which the individual clips leave the path of travel. As best seen in FIGURE 9 on the drawings, the edge 57 of the sheet 59 is resiliently gripped between jaws 58, which support the sheet 59 as the same is moved between the platforms 39 and 40.

The chain advancement element 48 is best seen in FIGURES 1, 7, 8 and 10 on the drawing, and differs from prior art constructions in that it is selectively adjustable for accurately regulating the amount of feed for each cycle, and advances the chain elements 46 and 47 by positive action. In the present construction, the first and second sprockets 50 and 52 of each of the chain elements 46 and 47 are of idler type, and the chain advancement means 48 includes means for positively gripping segments of the chain elements and advancing the same under pneumatic or hydraulic impulse. The element 48 includes a horizontally disposed platform 70 which rides upon a plurality of guide rods 71 and between sets of relatively fixed supports 72 and 73. The platform 70 supports on the upper surface thereof, a pair of movable carriages 74 and 75, which are provided with means for gripping the chain elements 46 and 47. The centrally disposed portion 75 is interconnected with an air cylinder 76 which moves the platform 70 leftwardly and rightwardly as seen on FIGURES 7 and 10. The lefthand and righthand gripping means 77 and 78 are substantially similar, and as best seen in FIGURE 8, each includes a lower support bracket 79, a vertically disposed bracket 81 and chain gripping upper and lower jaws 83 and 84, respectively. Mounted on the lower support bracket 79 are a pair of hydraulic or pneumatic cylinders 85 and 86 which selectively move the lower jaw 84 upwardly against the upper jaw 83 to grip an outwardly disposed segment 87 of each of the chain elements. From a consideration of FIGURES 7, 8 and 10, it will be apparent that at the start of a feeding stroke, air is supplied to the cylinders 85 and 86 to move the lower jaw 84 upwardly toward the upper jaw 83 to grasp the segment 87 therebetween following which the cylinder 76 moves the entire platform 70 rightwardly as seen of FIGURE 10, during which time the platform 70 moves upon the guide rods 71 between an adjustable and a fixed stop (not shown). Upon meeting the fixed stop, the platform 70 is halted, and the pressure within the cylinders 85 and 86 is released to result in separation of the lower jaw 84 from contact with its respective chain element. Air is then directed into the opposite end of the cylinder 76, to cause the platform 70 to return to its initial starting position for the commencement of another feeding cycle.

The heating means 24 may be of any suitable type, and preferably including electric heating coils (not shown). As best seen in FIGURE 7, it is disposed between the left and right hand feed chain elements 46 and 47, and serves to preheat the sheet material immediately before it reaches a forming station between the platforms 39 and 40.

The upper reciprocating die means 25 and lower reciprocating die means 26 are similar, see FIGURES 1 and 2, and symmetrically arranged, so that a description of the upper reciprocating die means 25 will serve equally well to described the lower. Accordingly, corresponding parts on the lower reciprocating die means 26 have been designated by similar reference characters with the additional suffix "a."

The upper reciprocating die means 25 is mounted beneath the upper horizontally disposed platform 39 and includes a hydraulic cylinder 92 having a piston rod 93 operating through a toggle linkage 94 to raise and lower a platen 95 upon which a portion of a die 96 is disposed (see FIGURES 2 and 11). Since both the upper portion of the die 96 and the lower portion of the die 96a are moveable into and out of the plane of feed of the sheet 59, deformation of the sheet can occur both above and below the plane of feed, thereby at least partially eliminating the necessity of dies having deep cavities in one portion of the die and corresponding projections on the other. Thus, the equivalent of deep drawings can be accomplished by moving material both above and below the plane of feed of the sheet 59 with a corresponding elimination of unnecessary strains upon the material being formed.

The toggle linkage 94 includes a bracket 98 mounted upon and moving axially with the piston rod 93. Connected to the bracket 98 are first and second connecting links 99, which are connected to pairs of folding links 101 and 102. The relative positions of the links 99—102 in the closed position in which the die portions 96 and 96a are positioned adjacent each other is shown on FIGURE 2, while the relative position of the same structure in withdrawn or disengaged condition is shown on FIGURE 11. It will be observed that the piston rod 93 travels a greater distance than that of the platen 95, the greatest mechanical advantage being obtained when the piston is near the end of its closing or engaging stroke.

The upper reciprocating sheet clamping means 27 and lower reciprocating sheet clamping means 28 are also substantially similar and symmetrically disposed, and, accordingly, a detailed description of the upper clamping means 27 will serve to describe the lower means 28. Corresponding parts of the lower clamping means 28 are designated by similar reference characters with the additional suffix "a."

The means 27 includes a pneumatic cylinder 104 having a piston 105 upon which are mounted a pair of rack means 106 and 107 (see FIGURES 6a and 6b). Mounted upon the upper surface of the upper platform 39 are a pair of longitudinally disposed shafts 108 and 109 having laterally extending arms 110 at each end thereof pivotally interconnected with links 111. The links 111 in turn support bracket members 112 upon which clamping members 113 are adjustably mounted by means of screws 114. The bracket members 112 are arranged for substantially vertical reciprocation by guide rods 115. Reference is made to FIGURES 4 and 5 in the drawing, in which FIGURE 4 discloses the relative position of the gripping members 113 when in engaged position, and FIGURE 5 shows the relative position of the component parts when in disengaged condition.

Referring to FIGURE 1, it will be observed that the clamping member 113 is positioned at either transverse edge of the platen 95, and the horizontally disposed edge 119 is of a length sufficient to engage substantially the entire width of the sheet 59 while clearing the chain elements 46 and 47 through means of cutout portions 120 and 120a (see FIGURES 4 and 5).

The clamping members 113 and 113a are mounted on brackets 113b in turn adjustably mounted on rails 113c (see FIGURE 1) to permit positioning of the clamps 113 and 113a in accordance with various sizes of die members and die impressions.

*Operation*

The operation of the device is generally similar to that of prior art devices, and during the course of a single cycle, the sheet 59 is fed from the spool 44 by the chain elements 46 and 47 in the manner above described. As the sheet passes beneath the heating means 24, the sheet is softened to permit the same to receive an impression from the dies 96—96a. At the start of the forming operation, and before the dies 96—96a are moved into the plane of the sheet, the piston 105 and its corresponding part on the lower reciprocating clamping means 28 are actuated, resulting in motion being transmitted through the rack means 106—107 to the shaft 108 and 109. This motion results in movement of the means 27 and 28 from the position shown on FIGURE 5 to the position shown on FIGURE 4 wherein the sheet 59 is grasped laterally both ahead of and behind the dies 96—96a. Following this operation, the cylinder 92 and its corresponding part on the lower die means 26 is actuated to result in the formation of an impression upon the sheet. The dies 96—96a are then retracted. As the sheet is supported longitudinally by the chain elements 46 and 47, and transversely by the clamping means 27 and 28, there is, in effect, a peripheral clamping action of the segment of the sheet 59 being formed, and any distortion introduced into the sheet during the forming operation is not transmitted past this segment in either a forwardly or a rearwardly extending direction. During the short interval of time in which the dies 96—96a are withdrawn, and before the disengagement of the clamping means 27—28, the material has an opportunity to slightly cool, so that by the time the clamping means 27 and 28 are raised, the possibility of distortion being transmitted is practically eliminated.

We wish it to be understood that we do not consider the invention limited to the specific details of structure shown and set forth in this specification, for obvious modifications will occur to those skilled in the art to which the invention pertains.

We claim:

1. Planar sheet feeding means for use in conjunction with a shaping press or similar device comprising: a chain element, said chain element having a plurality of gripping links adapted to engage opposed surfaces of said sheet material, means for supporting and driving said chain element to present a segment of the same to lie within the plane of travel of said planar sheet material; means for closing said gripping links at a first point along said segment, and means for opening said gripping links at a second point along said segment; and means for intermittently gripping a second segment of said chain to advance said chain in substantially uniform increments.

2. Planar sheet feeding means for use in conjunction with a shaping press or similar device comprising: a chain element, said chain element having a plurality of gripping links adapted to engage opposed surfaces of said sheet material, means for supporting and driving said chain element to present a segment of the same to lie within the plane of travel of said planar sheet material; means for closing said gripping links at a first point along said segment, and means for opening said gripping links at a second point along said segment; and pneumatically operated motion imparting means for intermittently gripping a second segment of said chain to advance said chain in substantially uniform increments.

3. Continuous planar sheet feeding means for use with a shaping or similar device comprising: a pair of sprocket chain elements, first and second pluralities of sprocket elements, each supporting one of said sprocket chain elements in a common plane, each of said sprocket chain elements having a plurality of resilient clips thereon adapted to engage the edge portions of a continuous planar sheet; and means for intermittently and simultaneously driving said sprocket chain elements to present segments of the same to lie within the path of travel of the parallel side edges of said continuous sheet, said means including means for simultaneously gripping second segments of each of said chain elements and reciprocable along an adjustable planar path of travel parallel to that of said continuous planar sheet; a first pair of means for opening successive clips on each sprocket chain element substantially at the points of entry of said clips into said path of travel, and a second pair of means for opening said clips on each sprocket chain element substantially at the points of exit from said paths of travel; whereby said continuous sheet may be supported substantially in a plane along its entire length at the side edges thereof during the period in which said sheet is disposed between said first pair of continuous segments.

4. In a press of the class described, including reciprocating die means, the improvement comprising: continuous planar sheet feeding means including a pair of sprocket chain elements, first and second pluralities of sprocket elements, each supporting one of said sprocket chain elements in a common plane, each of said sprocket chain elements having a plurality of resilient clips thereon adapted to engage the edge portions of a continuous planar sheet; and means for intermittently and simultaneously driving said sprocket chain elements to present segments of the same to lie within the path of travel of the parallel side edges of said continuous sheets, said means including means for simultaneously gripping second segments of each of said chain elements and reciprocable along an adjustable planar path of travel parallel to that of said continuous planar sheet; a first pair of means for opening successive clips on each sprocket chain element substantially at the points of entry of said clips into said path of travel, and a second pair of means for opening said clips on each sprocket chain elements substantially at the points of exit from said paths of travel; whereby said continuous sheet may be supported substantially in a plane along its entire length at the side edges thereof during the period in which said sheet is disposed between said first pair of continuous segments; and a pair of reciprocating clamp members moveably positioned above and below the plane of said sprocket chain elements and moveable into gripping position to engage said continuous sheet therebetween along a line substantially perpendicular to the path of travel of said sheet.

5. In a press of the class described, including reciprocating die means, the improvement comprising: continuous planar sheet feeding means including a pair of sprocket chain elements, first and second pluralities of sprocket elements, each supporting one of said sprocket chain elements in a common plane, each of said sprocket chain elements having a plurality of resilient clips thereon adapted to engage the edge portions of a continuous planar sheet; and means for intermittently and simultaneously driving said sprocket chain elements to present segments of the same to lie within the path of travel of the parallel side edges of said continuous sheets, said means including means for simultaneously gripping second segments of each of said chain elements and reciprocable along an adjustable planar path of travel parallel to that of said continuous planar sheet; a first pair of means for opening successive clips on each sprocket chain element substantially at the points of entry of said clips into said path of travel, and a second pair of means for opening said clips on each sprocket chain elements substantially at the points of exit from said paths of travel; whereby said continuous sheet may be supported substantially in a plane along its entire length at the side edges thereof during the period in which said sheet is disposed between said first pair of continuous segments; and a plurality of pairs of reciprocating clamps, one pair being located on either side of said reciprocating die means and moveable into gripping position to engage said continuous sheet therebetween along lines substantially perpendicular to the path of travel of said sheet.

References Cited in the file of this patent

UNITED STATES PATENTS

| | | |
|---|---|---|
| 1,050,857 | Sheldon | Jan. 21, 1913 |
| 2,017,459 | Howe et al. | Oct. 15, 1935 |
| 2,120,328 | Ferngren | June 14, 1938 |

(Other references on following page)

UNITED STATES PATENTS

| | | |
|---|---|---|
| 2,229,613 | Strauch | Jan. 21, 1941 |
| 2,270,187 | Dulmage | Jan. 13, 1942 |
| 2,473,404 | Young | June 14, 1949 |
| 2,490,781 | Cloud | Dec. 13, 1949 |
| 2,622,401 | Drago | Dec. 23, 1952 |
| 2,622,874 | Haller | Dec. 23, 1952 |
| 2,684,769 | Wallerius et al. | July 27, 1954 |
| 2,736,150 | Loew | Feb. 28, 1956 |
| 2,857,158 | Ungerer | Oct. 21, 1958 |
| 2,974,366 | Bauman | Mar. 14, 1961 |

FOREIGN PATENTS

| | | |
|---|---|---|
| 638,135 | Great Britain | May 31, 1950 |